UNITED STATES PATENT OFFICE.

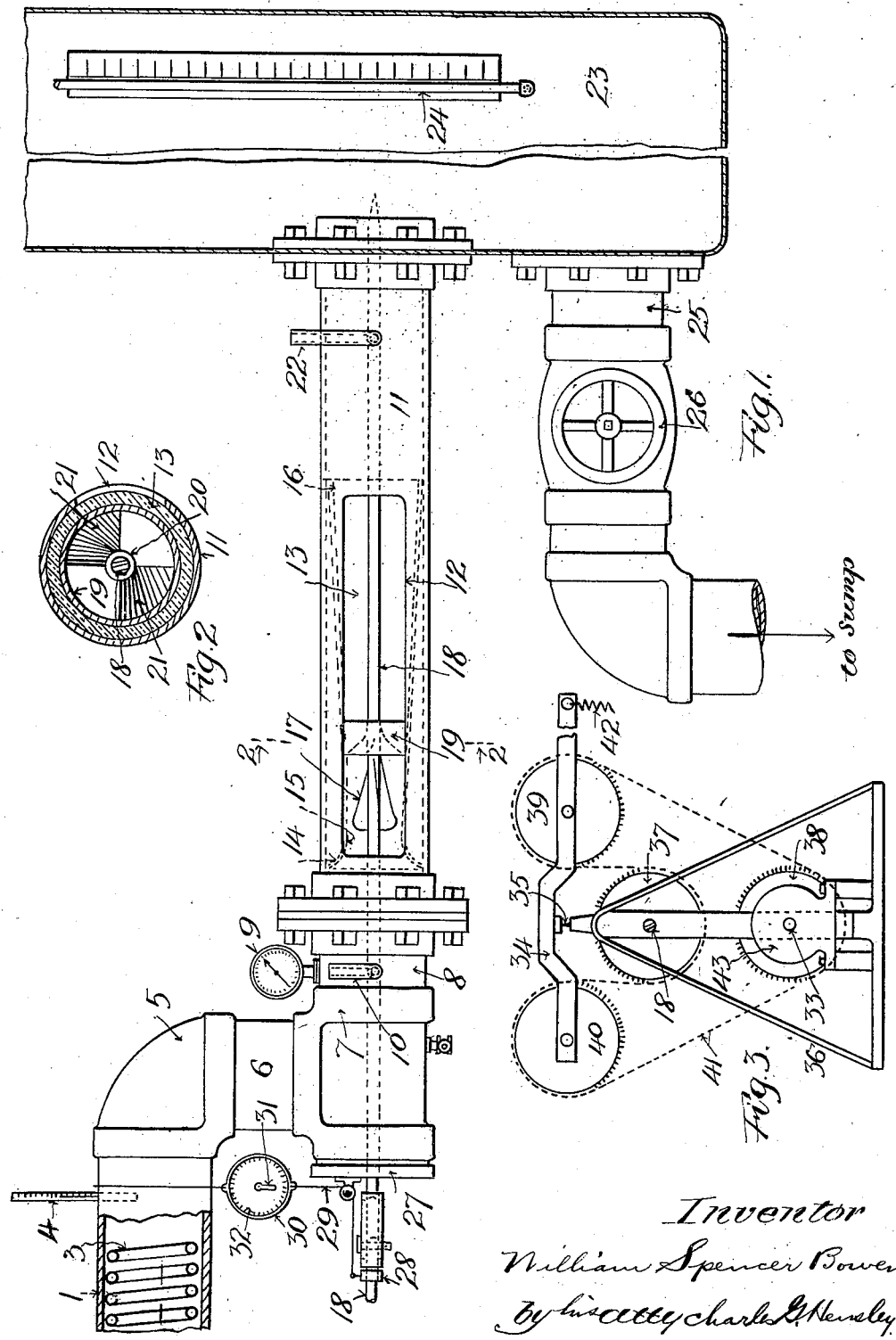

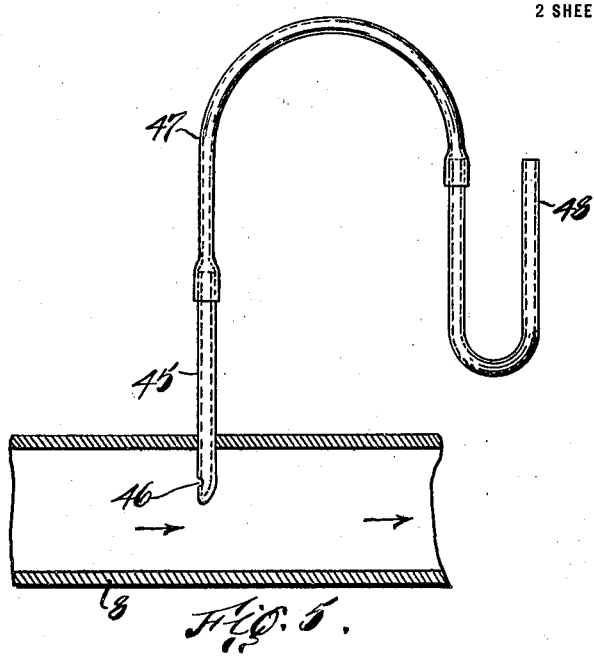
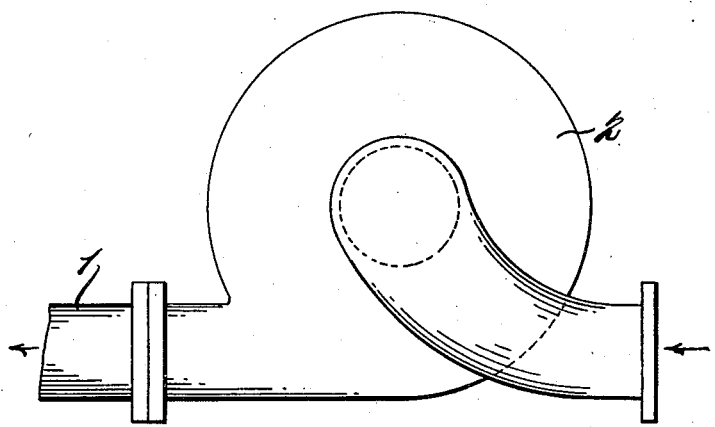

WILLIAM SPENCER BOWEN, OF NEW YORK, N. Y.

PROPELLER-TESTING DEVICE.

1,351,738.   Specification of Letters Patent.   Patented Sept. 7, 1920.

Application filed September 10, 1917. Serial No. 190,557.

*To all whom it may concern:*

Be it known that I, WILLIAM SPENCER BOWEN, a citizen of the United States, and a resident of the city, county, and State of New York, have invented certain new and useful Improvements in Propeller-Testing Devices, of which the following is a specification.

The object of my invention is to provide a device for testing propellers adapted for use in marine propulsion for the purpose of studying the action of the propellers and for observing the results by direct observation.

Another object is to provide a device for studying the action of a propeller under standard conditions so that the law of comparison may be applied to the results obtained. The device is adapted to test propellers under conditions corresponding with the conditions present in the actual use of propellers in marine propulsion. For instance, I am able to obtain the effect of submergence to varying degrees and to observe and tabulate the various elements entering into the conditions of operation in actual service.

The apparatus consists of a supply line adapted to be connected with a pump of sufficient capacity to correspond with the static head of submergence, the head pumped by the propeller, and the head corresponding to the velocity of the lead. The supply line preferably contains a steam coil and a thermometer and by means of the steam coil the supply may be heated to any required degree for the purpose of offsetting atmospheric pressure by means of vapor tension.

There is a pressure gage for determining the pressure of the fluid previous to its entrance to the propeller or a Pitot tube or both. These are for the purpose of determining the velocity of the fluid just prior to its reaching the propeller. Following in line of flow of the fluid there is a concentrator for concentrating the fluid around the propeller by reducing the area and by increasing the velocity of the fluid. The concentrator is made of transparent material such as glass so that the action of the propeller may be observed from the outside. Means, such as a Pitot tube, is arranged beyond the propeller for determining the velocity and beyond this there is a tank in which the liquid may be forced and the liquid in this tank may be maintained at any desired depth to provide any desired static head. Preferably, the tank is adapted to empty into a sump from which the liquid may be taken back to the supply line to be used again. The propellers are readily detachable so that it is an easy matter to substitute any variety of propeller for testing. In addition to the above elements, I have provided means for driving the propeller, for determining the number of revolutions, and for measuring the thrust and torque of the propeller shaft.

In the drawing forming part of this application,

Figure 1 is an elevation partly in section of my propeller testing device,

Fig. 2 is a sectional view taken on the line 2—2 of Fig. 1,

Fig. 3 is an elevation of a dynamometer,

Fig. 4 is a side elevation of an ordinary centrifugal pump for forcing the fluid into the pipe 1, Fig. 5 is a detail view of a well known Pitot tube for measuring the velocity of the fluid.

The liquid, which may be fresh or salt water, is delivered to the testing device through the supply pipe 1 from any suitable source such as a pump 2 which is designed with sufficient capacity to take care of the static head of submergence, the head pumped by the propeller and the head corresponding to the velocity of the lead, the velocity at which the propeller would advance if employed on a moving vessel. In the course of travel of the liquid, before it reaches the propeller I provide means for offsetting the atmospheric pressure, and for this purpose I have shown a steam coil 3 arranged in the supply pipe 1 for raising the temperature of the inflowing liquid for the purpose of offsetting the atmospheric pressure, ordinarily present where the propeller is submerged in a body of water, by increasing the vapor tension. By varying the temperature of the water the vapor tension may be controlled and by this means it is possible to make a small propeller operating under a foot or two head correspond to the action of a large or full sized propeller operating under any degree of submergence. The thermometer 4 is inserted in the supply line to determine the action of the steam coil on the fluid. The supply line 1 is shown connected by an elbow 5 with a short pipe section 6 which, in turn, is connected by the coupling 7 with the pipe 8 which latter is in alinement with the propeller shaft. The pressure gage 9 is for determining the velocity of the fluid just previous to its entrance into the concentrator; and in addition I have shown a Pitot tube 10 which may be used for determining the velocity of the fluid before its entrance into the concentrator. The Pitot tube comprises a tube 45 projecting into the pipe 8 where it has an inlet orifice 46 directed to the left. The upper end of the tube 45 projects from the pipe 8, and it is connected by a hose 47 with one leg of the manometer 48.

Following the above mentioned elements there is a pipe section 11 having an opening 12 through which observation may be made; and the concentrator 13 which, as above stated, is made of transparent material such as glass, is inserted in the pipe section 11 and opposite the observation opening.

The form of concentrator herein shown by way of example, has its interior shaped to correspond with a Venturi tube. The forward end 14 is of gradually decreasing diameter to the point 15 of least area and from this point to the rear end 16, the bore of the concentrator is of gradually increasing diameter. The propeller 17 is arranged on the shaft 18 and it is so mounted that the forward end of the propeller is near or within the point 15 of smallest area of the concentrator. Within the concentrator 1, I prefer to arrange a member 19 which has a bearing 20 for the propeller shaft 18 and which also has rectifying vanes 21 which are adapted to rectify the direction of the stream of liquid acted upon by the propeller, and these fixed vanes are similar in their action to the fixed vanes of the Thornycroft turbine propeller. Following the propeller and fixed vanes in the tube 11, there is shown a Pitot tube 22 for determining the velocity head in the fluid behind the propeller. The tube or pipe 11 is adapted to empty into the tank 23 which is provided with an ordinary depth gage 24. The tank is provided with an outflow at 25, and the valve 26 is adapted to regulate the outflow in order that the liquid in the tank 23 may be kept at any desired depth to provide a static head to correspond with submergence of a propeller in actual marine operation.

The pipe 25 may discharge into a sump (not shown), from which the liquid may be pumped to the supply line to be used over again.

The shaft 18 has a forward bearing at 27 and it projects beyond the forward end of the pipe 11 and coupling 7. There is a sleeve 28 on the shaft 18 and to this is attached one end of the cord 29 which operates the indicator 30 to indicate the end thrust of the propeller shaft. The indicator is not shown in greater detail as instruments of this character are well known. The position of the hand 31 on the dial 32 at all times will indicate the end thrust of the propeller shaft, so that this factor will always be available for comparative tests.

The power applied to the shaft is to be calculated by operating the shaft with a variable speed motor of known efficiency, or preferably, by using a dynamometer. In the drawings I have shown a Durand dynamometer interposed between the motor and propeller shaft, the construction and operation of which are well known. The operating motor 43, is attached to the shaft 33 of the dynamometer. There is a balanced lever 34 mounted on a pivot 35 at the top or the frame 36 and a spring 42 is adapted to exert a tipping pressure on the lever.

The shaft 18 is journaled in the frame 36 and is provided with a sprocket 37 and the motor shaft 33 is likewise provided with a sprocket 38. Sprockets 39 and 40 are arranged on the outer ends of the balanced lever 34. An endless chain 41 engages over the sprocket 38, the sprocket 39 then over the sprocket 37 and then over the sprocket 40. The operating power is applied to the propeller shaft through the chain and the various sprockets. The torque of the propeller shaft is determined by reading the displacement of the balanced lever 34 in opposition to the spring 42.

From the above it will be apparent that I have provided various elements for operating propellers under the same conditions as if they were actually submerged as when used in marine propulsion, and for determining every factor entering into their operation so that the efficiency of any given propeller may be determined and so that comparisons may be made between different forms of propellers.

Having described my invention, what I claim is:

1. A propeller testing device comprising means forming a liquid passage and having a transparent portion through which the propeller may be observed, a propeller adapted to revolve within said passage adjacent the transparent portion of said liquid passage to propel the liquid through said passage, power means for operating the propeller from without said liquid passage, and a rectifying vane arranged behind the propeller and within said transparent liquid passage and adapted to rectify the current of liquid propelled by said propeller.

2. A propeller testing device comprising transparent means forming a liquid passage having a transparent portion and having a tapering bore forming a concentrator, and a propeller adapted to be revolved within said transparent means and to propel liquid therethrough.

3. A propeller testing device comprising means forming a liquid passage, a propeller adapted to be revolved in said means, and means for supplying liquid to said first means under a definite head and means for measuring the velocity of the liquid in advance of and behind said propeller.

4. A propeller testing device comprising means forming a liquid passage, a propeller arranged in said passage and adapted to propel liquid therethrough, a receptacle for receiving the liquid from said first means and adapted to maintain a constant static head in said liquid passage and means for heating the liquid in advance of said propeller to offset atmospheric pressure.

5. A propeller testing device comprising means forming a liquid passage, means for supplying liquid to said passage under a definite head, a propeller arranged in said passage and adapted to propel liquid therethrough and a receptacle independent of said source of supply for receiving the liquid from said liquid passage and adapted to maintain a constant static head in said liquid passage.

6. A propeller testing device comprising means forming a liquid passage, a propeller arranged in said passage and adapted to propel liquid therethrough, a receptacle for receiving the liquid from said first means and means for regulating the depth of liquid in said receptacle to vary the static head in said liquid passage to correspond with varying degrees of propeller submergence.

7. A propeller testing device comprising means forming a liquid passage, a propeller arranged in said passage and adapted to propel liquid therethrough, a receptacle for receiving the liquid from said first means and adapted to maintain a constant static head in said passage, and means for supplying liquid to said first means under a constant head.

8. A propeller testing device comprising transparent means forming a liquid passage, a propeller arranged in said transparent means and adapted to propel liquid therethrough, and a receptacle for receiving the liquid from said first means and adapted to maintain a constant static head in said liquid passage and means independent of said receptacle for supplying liquid to said first means under a constant head.

9. A propeller testing device comprising means forming a liquid passage, a shaft, a propeller thereon arranged in said passage and adapted to propel liquid therethrough, a receptacle for receiving the liquid from said first means, means for varying the depth of liquid in said receptacle to modify the static head in said passage, means for measuring the velocity of the liquid in said passage, means for measuring the end thrust of said shaft and means for measuring the torque thereof.

Signed, this 25th day of August, 1917.

WM. SPENCER BOWEN.